(12) United States Patent
Huang

(10) Patent No.: US 11,039,096 B2
(45) Date of Patent: Jun. 15, 2021

(54) IMAGE PROCESSING DEVICE, IMAGE PROCESSING METHOD AND STORAGE MEDIUM

(71) Applicant: NEC CORPORATION, Tokyo (JP)

(72) Inventor: Chenhui Huang, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/607,600

(22) PCT Filed: Apr. 19, 2018

(86) PCT No.: PCT/JP2018/016068
§ 371 (c)(1),
(2) Date: Oct. 23, 2019

(87) PCT Pub. No.: WO2018/198916
PCT Pub. Date: Nov. 1, 2018

(65) Prior Publication Data
US 2020/0304739 A1    Sep. 24, 2020

(30) Foreign Application Priority Data
Apr. 24, 2017  (JP) .............................. JP2017-084927

(51) Int. Cl.
*H04N 5/365* (2011.01)
*H04N 5/367* (2011.01)
*H04N 5/361* (2011.01)

(52) U.S. Cl.
CPC ............. *H04N 5/367* (2013.01); *H04N 5/361* (2013.01)

(58) Field of Classification Search
None
See application file for complete search history.

(56) References Cited

U.S. PATENT DOCUMENTS 6,529,618 B1 * 3/2003 Ohara ................... G06T 11/005
382/132
2003/0099026 A1   5/2003  Sandstrom
2008/0117318 A1   5/2008  Aoki

FOREIGN PATENT DOCUMENTS

| JP | 2001-8100 A | 1/2001 |
| JP | 2005-510862 A | 4/2005 |
| JP | 2005-324015 A | 11/2005 |
| JP | 3995511 B2 | 10/2007 |
| JP | 2008-131273 A | 6/2008 |
| JP | 2012-70319 A | 4/2012 |
| JP | 2014-165777 A | 9/2014 |

OTHER PUBLICATIONS

International Search Report for PCT/JP2018/016068 dated, Jun. 19, 2018 (PCT/ISA/210).
Written Opinion of the International Searching Authority for PCT/JP2018/016068 dated Jun. 19, 2018 (PCT/ISA/237).

* cited by examiner

*Primary Examiner* — Mark T Monk
(74) *Attorney, Agent, or Firm* — Sughrue Mion, PLLC

(57) ABSTRACT

In an aspect, an image processing device includes: first specification means for specifying an abnormal pixel from a plurality of pixels according to a first method; and second specification means for specifying an abnormal pixel, from the plurality of pixels excluding the abnormal pixel specified by the first specification means, according to a second method different from the first method.

16 Claims, 10 Drawing Sheets

Fig.9

| ORDER | PROCEDURE 1 | PROCEDURE 2 | PROCEDURE 3 | PROCEDURE 4 |
|---|---|---|---|---|
| 1 | METHOD BASED ON S/N RATIO | METHOD BASED ON S/N RATIO | METHOD BASED ON DIFFERENCE ΔV | METHOD BASED ON S/N RATIO |
| 2 | METHOD BASED ON DIFFERENCE ΔV | METHOD BASED ON OUTPUT SIGNAL V | METHOD BASED ON OUTPUT SIGNAL V | METHOD BASED ON DIFFERENCE ΔV |
| 3 | METHOD BASED ON OUTPUT SIGNAL V | — | — | — |

IMAGE PROCESSING DEVICE, IMAGE PROCESSING METHOD AND STORAGE MEDIUM

CROSS REFERENCE TO RELATED APPLICATIONS

This application is a National Stage of International Application No. PCT/JP2018/016068 filed Apr. 19, 2018, claiming priority based on Japanese Patent Application No. 2017-084927, filed Apr. 24, 2017, the disclosures of which are incorporated herein in their entirety by reference

TECHNICAL FIELD

The present invention relates to an image processing device and the like.

BACKGROUND ART

An image sensor may have a defect caused by various factors attributable to a manufacturing process and the like. For example, a sensor element used for implementing an image sensor may have a defect caused by a structural factor such as a flaw or a surface strain on a semiconductor mesa, and a defect caused an electrical factor such as a junction rupture between circuitries or a junction short circuit between elements.

A defect of a sensor element may cause an abnormality in a pixel that is an output result. The abnormality described herein means brightness or darkness that is singular compared with a luminance value to be essentially output, or unresponsiveness to incident light or an intensity change thereof. Hereinafter, for convenience of description, a pixel in which such an abnormality is caused will be referred to as an "abnormal pixel", and a pixel that is not an abnormal pixel will be referred to as a "normal pixel".

Techniques described in PTLs 1 to 3 are examples of a technique relevant to detection of an abnormal pixel. PTL 1 discloses a defective pixel compensation method in which a predetermined pattern is projected on an object to be processed. PTL 2 discloses an infrared imaging device that determines a defective element on the basis of a plurality of determination methods. PTL 3 discloses a method for detecting a flicker defective pixel generated in a solid state image sensor.

CITATION LIST

Patent Literature

[PTL 1] Japanese Translation of PCT International Application Publication No. JP-T-2005-510862
[PTL 2] Japanese Unexamined Patent Application Publication No. 2001-008100
[PTL 3] Japanese Patent No. 3995511

SUMMARY OF INVENTION

Technical Problem

In some cases, it is difficult to distinguish between a normal pixel and an abnormal pixel. For example, in a case that one image sensor includes a relatively large number of abnormal pixels, it may be difficult to distinguish between a normal pixel and an abnormal pixel. In such a case, detecting a pixel abnormality by referring to peripheral pixels as in the technique disclosed in, for example, detection accuracy may be deteriorated because the peripheral pixels also include an abnormal pixel.

An exemplary object of the present invention is to enhance accuracy in detection of an abnormal pixel.

Solution to Problem

In an aspect, an image processing device includes: first specification means for specifying an abnormal pixel from a plurality of pixels according to a first method; and second specification means for specifying an abnormal pixel, from the plurality of pixels excluding the abnormal pixel specified by the first specification means, according to a second method different from the first method.

In another aspect, an image processing method includes: specifying an abnormal pixel from a plurality of pixels according to a first method; and specifying an abnormal pixel, from the plurality of pixels excluding the specified abnormal pixel, according to a second method different from the first method.

In yet another aspect, a storage medium stores a program causing a computer to execute: first specification processing of specifying an abnormal pixel from a plurality of pixels according to a first method; and second specification processing of specifying an abnormal pixel, from the plurality of pixels excluding the abnormal pixel specified by the first specification processing, according to a second method different from the first method.

Advantageous Effects of Invention

The present invention enhances accuracy in detection of an abnormal pixel.

BRIEF DESCRIPTION OF DRAWINGS

FIG. 9 exemplifies a procedure for specifying an abnormal pixel.

EXAMPLE EMBODIMENT

First Example Embodiment

Figure 1:
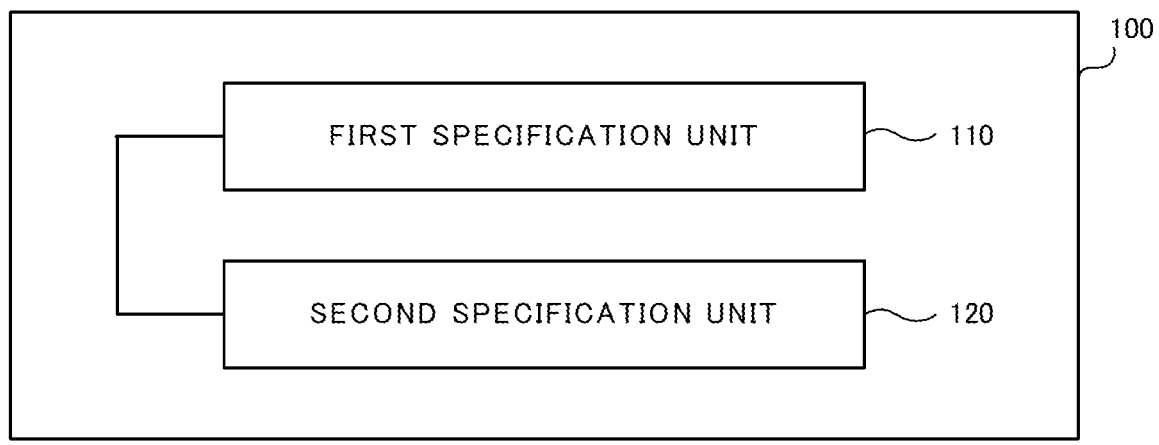
FIG. 1 is a block diagram illustrating one example of a configuration of an image processing device.

FIG. 1 is a block diagram illustrating a configuration of an image processing device 100 according to one example embodiment. The image processing device 100 is configured so as to include at least a first specification unit 110 and a second specification unit 120. The image processing device 100 may include another configuration element as needed.

The image processing device 100 detects a normal pixel from a plurality of pixels. The plurality of pixels described herein are included in a certain image. The plurality of pixels correspond to outputs from a plurality of sensor elements included in an image sensor. The image sensor includes, for example, a plurality of sensor elements planarly arranged under a predetermined rule. The image sensor may have sensitivity to any of visible light and invisible light (e.g. infrared light). However, hereinafter, for convenience of description, the image sensor is a visible light sensor.

An abnormal pixel described herein means a pixel that is not a normal pixel. The normal pixel means a pixel whose output satisfies a predetermined criterion. Thus, the abnormal pixel can be also called a pixel whose output does not satisfy a predetermined criterion. The abnormal pixel described herein may be rephrased as a defective pixel(s), a bad pixel(s), or a missing pixel(s) (a pixel(s) in which information to be essentially included is missing).

The first specification unit 110 and the second specification unit 120 specify an abnormal pixel. The first specification unit 110 and the second specification unit 120 use different methods of specifying an abnormal pixel. Hereinafter, for convenience of description, a specification method used by the first specification unit 110 is referred to as a "first method", and a specification method used by the second specification unit 120 is referred to as a "second method". The first method and the second method are not necessarily limited to a particular method. The first method and the second method themselves may be a well-known method.

Hereinafter, for convenience of description, an abnormal pixel specified by the first specification unit 110 is referred to as a "first abnormal pixel", and an abnormal pixel specified by the second specification unit 120 is referred to as a "second abnormal pixel". It can be said that the first specification unit 110 and the second specification unit 120 are common in a point that both specify an abnormal pixel, but have different criteria for determining (that is, methods of specifying) an abnormality. Thus, the first abnormal pixel and the second abnormal pixel described herein are also common in a point of being an abnormal pixel while merely being determined based on different criteria for determining an abnormality. The numbers of first abnormal pixels and the number of second abnormal pixels are both equal to or greater than one (typically, plural).

In some cases, the first specification unit 110 and the second specification unit 120 statistically specify an abnormal pixel. For example, the first specification unit 110 specifies the first abnormal pixel on the basis of a frequency distribution in a case where a characteristic of a plurality of pixels is represented by using a predetermined variate (hereinafter, also referred to as a "first variate"). The second specification unit 120 specifies the second abnormal pixel on the basis of a frequency distribution in a case where a characteristic of a plurality of pixels is represented by using a variate (hereinafter, also referred to as a "second variate") that is other than the first variate. The first variate and the second variate are selected in such a way that, for example, distinguishment between a normal pixel and an abnormal pixel becomes easier in the frequency distribution using the first variate than in the frequency distribution using the second variate.

The first specification unit 110 and the second specification unit 120 are configured in such a way as to specify an abnormal pixel in a stepwise fashion. Specifically, after an abnormal pixel is specified by the first specification unit 110 according to the first method, the second specification unit 120 further specifies an abnormal pixel according to the second method.

More specifically, the second specification unit 120 specifies the second abnormal pixel from a plurality of pixels excluding the first abnormal pixel, among pixels which are input to the image processing device. Thus, a normal pixel is a pixel that is not specified by the first specification unit 110 as the first abnormal pixel and is also not specified by the second specification unit 120 as the second abnormal pixel, out of a plurality of pixels which are input to the image processing device 100.

For example, the total number of pixels input to the image processing device 100 is denoted by M, the number of first abnormal pixels specified by the first specification unit 110 is denoted by $m_1$, and the number of second abnormal pixels specified by the second specification unit 120 is denoted by $m_2$. In this case, the second specification unit 120 specifies the second abnormal pixel from $(M-m_1)$ normal pixels. The total number of abnormal pixels is $(m_1+m_2)$, and the total number of normal pixels is $(M-m_1-m_2)$.

The configuration of the image processing device 100 is as described above. With this configuration, the image processing device 100 detects an abnormal pixel from a plurality of pixels which are input. In other words, the image processing device 100 classifies a plurality of input pixels into normal pixels and abnormal pixels. The image processing device 100 detects an abnormal pixel by the following operation.

Figure 2:
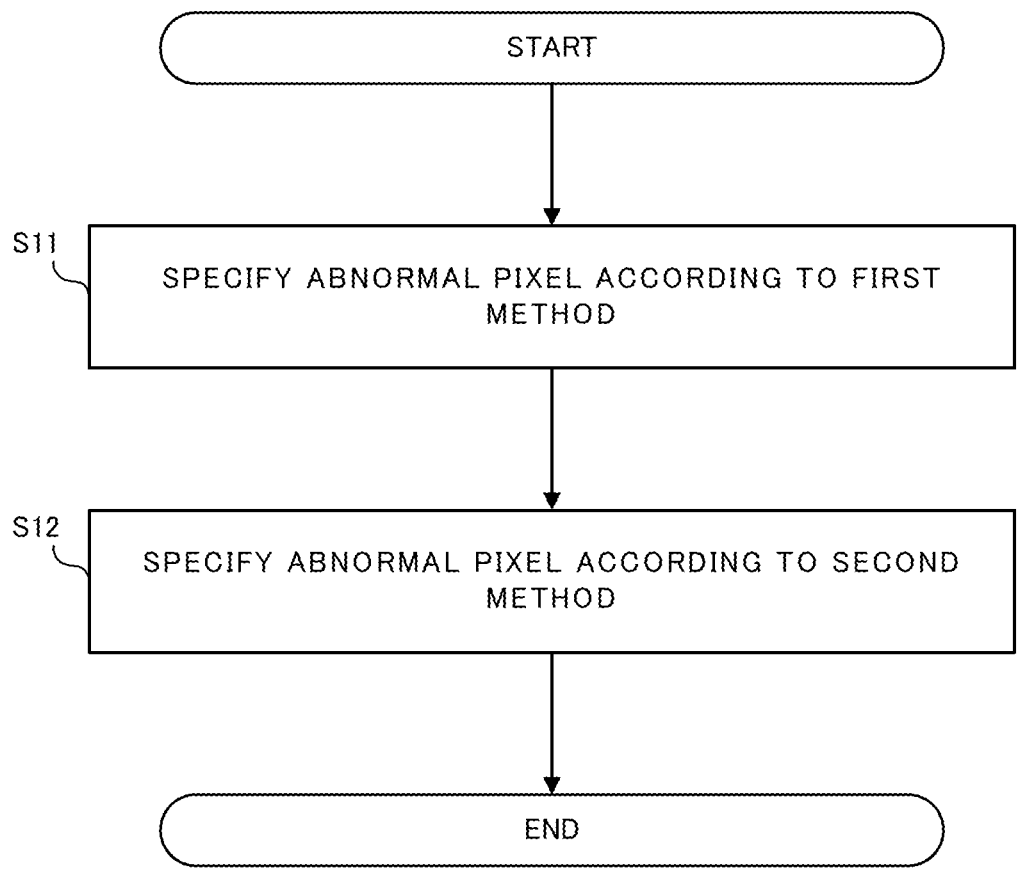
FIG. 2 is a flowchart illustrating one example of an operation of the image processing device.

FIG. 2 is a flowchart illustrating an operation of the image processing device 100. In Step S11, the first specification unit 110 specifies a first abnormal pixel from a plurality of input pixels according to the first method. In Step S12, the second specification unit 120 specifies, from the plurality of input pixels excluding the first abnormal pixel specified in Step S11, the second abnormal pixel according to the second method.

Figure 3A:
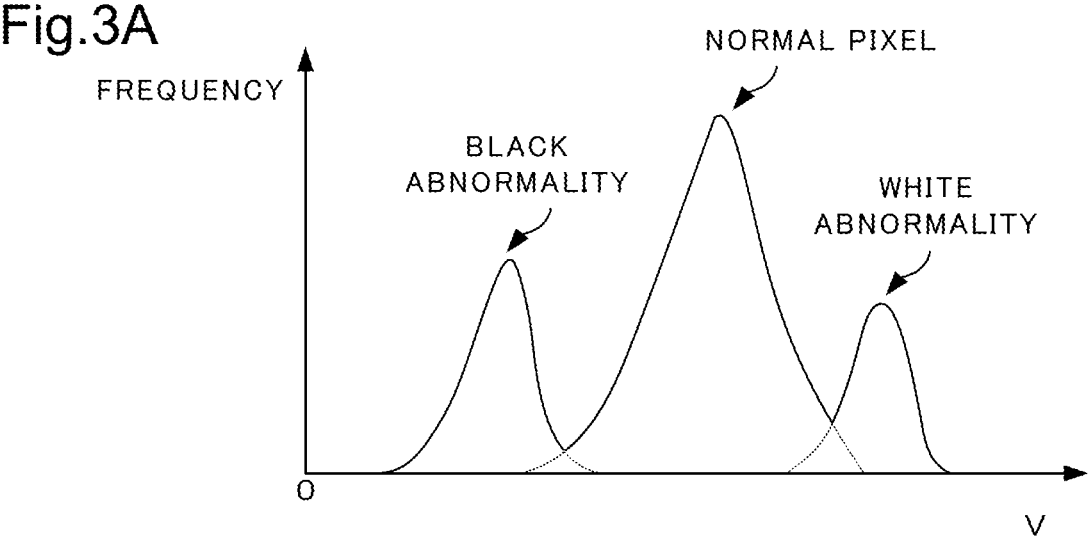
FIG. 3A illustrates one example of a frequency distribution indicating an output characteristic (V) of an image sensor.

FIG. 3A illustrates one example of a frequency distribution indicating an output characteristic of a certain image sensor. In this example, an output signal V means a response of each pixel in a case where incident light is irradiated from a surface light source with a predetermined uniform luminance level. The output signal V may be rephrased as a pixel value, a luminance value, or the like. The output signal V is equivalent to one example of the above-described second variate.

Ideally, individual pixels are supposed to indicate the same value because of the uniform incident light. However, an abnormal pixel indicate a response different from those of normal pixels. Practically, even output signals of normal pixels are distributed in a finite range including a certain value that is a mode. For such a reason, the output signal V includes various values.

Two tendencies are conceivable for an output signal of an abnormal pixel. First, an abnormal pixel may indicate a response brighter (that is, larger) than that of a normal pixel. Hereinafter, such an abnormality is also referred to as a "white abnormality". Second, an abnormal pixel may indicate a response darker (that is, smaller) than that of a normal pixel. Hereinafter, such an abnormality is also referred to as a "black abnormality".

These abnormal pixels are pixels that at least indicate responses to incident light but the responses are not normal. Such abnormal pixels are distributed in finite ranges each including certain values that are modes, similarly to normal pixels. In that case, three peaks appear in the frequency distribution of the output signal V. In other words, the frequency distribution of the output signal V is a multimodal distribution including a plurality of distributions.

The multimodal distribution in the present example embodiment may be a bimodal distribution. In other words, the multimodal distribution described herein is a distribution having two or more peaks (local maximums) of frequency. In other words, it can be also said that the multimodal distribution described herein means a distribution other than a unimodal distribution, among distributions with appearance of a peak.

When a ratio of abnormal pixels existing in an image is small, a region of distribution of normal pixels and a region of distribution of abnormal pixels do not overlap each other. However, when a ratio of abnormal pixels existing in an image is increased, a region of distribution of normal pixels and a region of distribution of abnormal pixels come to overlap each other. A "region of distribution of normal pixels (or abnormal pixels)" herein means a frequency distribution of only normal pixels (or abnormal pixels) in a case where a normal pixel and an abnormal pixel are assumed to be distinguishable. Further, a state in which a region of distribution of normal pixels and a region of distribution of abnormal pixels overlap each other can be also said as a state in which a distribution range of normal pixels and a distribution range of abnormal pixels have overlapping with each other.

As in the example in FIG. 3A, when a region of distribution of normal pixels and a region of distribution of abnormal pixels overlap each other and are represented by one distribution curve, it becomes extremely difficult to distinguish between a normal pixel and an abnormal pixel on the basis of only the frequency distribution of the output signal V. When overlapping occurs as in FIG. 3A, abnormal pixels are not able to be extracted in such a way that the abnormal pixels do not include any normal pixels, even by setting any threshold value for the output signal V.

Figure 3B:
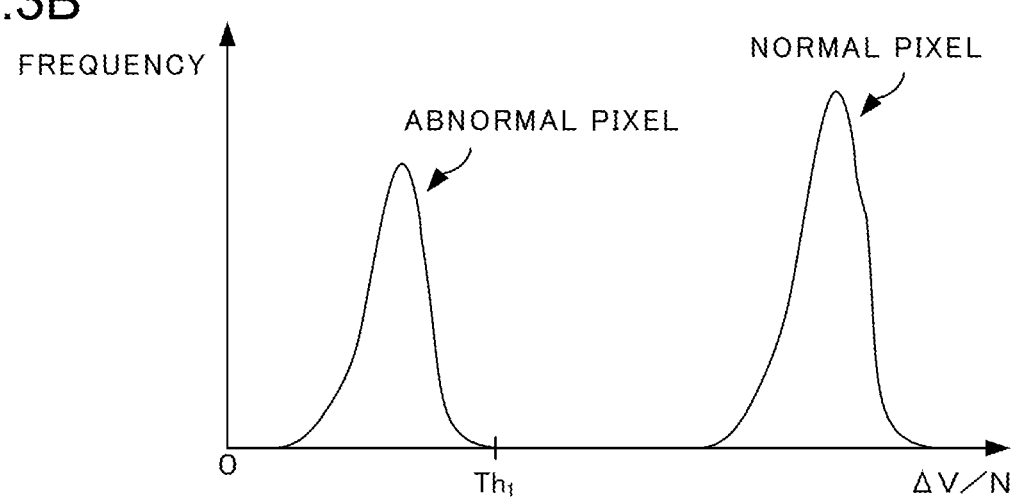
FIG. 3B illustrates one example of a frequency distribution indicating an output characteristic ($\Delta V/N$) of the image sensor.

FIG. 3B illustrates one example of a frequency distribution in a case where an output characteristic of the image sensor exemplified in FIG. 3A is represented by using another variate. In this example, the variate is denoted by $\Delta V/N$. Here, $\Delta V$ means a difference between responses to incident light from two individual surface light sources with different luminance levels. N means a noise in sensor elements, that is, a difference between a maximum value and a minimum value of responses to incident light being incident over a predetermined period of time at a predetermined uniform luminance level on sensor elements constituting an image sensor. $\Delta V/N$ is equivalent to one example of the above-described first variate.

In the case of normal pixels, the difference $\Delta V$ indicates a fixed value depending on a luminance difference in incident light. In contrast, in the case of abnormal pixels, the difference $\Delta V$ indicates a value different from a value in normal pixels. For example, abnormal pixels may indicate a fixed response regardless of a luminance level of incident light, or may indicate responses having a difference smaller in comparison with normal pixels. In such a case, the difference $\Delta V$ in abnormal pixels is smaller than the difference $\Delta V$ in normal pixels.

The noise N is small in normal pixels. Meanwhile, abnormal pixels have scattering in responses in some cases. The noise N in such abnormal pixels has a larger value than that of normal pixels.

Thus, in abnormal pixels, the difference $\Delta V$ tends to be small and the noise N tends to be large. Therefore, $\Delta V/N$ tends to be small in abnormal pixels and tends to be large in normal pixels. Consequently, in the frequency distribution of $\Delta V/N$, a distribution curve for normal pixels is located on a right side (a larger-value side) and a distribution curve for abnormal pixels is located on a left side (a smaller-value side), as exemplified in FIG. 3B.

The frequency distribution of $\Delta V/N$ is a multimodal distribution similarly to the frequency distribution of the output signal V. However, the frequency distribution of $\Delta V/N$ has overlapping smaller in comparison with the frequency distribution of the output signal V. In other words, in comparison with the frequency distribution of the output signal V, the frequency distribution of $\Delta V/N$ has smaller overlapping between a region of distribution of normal pixels and a region of distribution of abnormal pixels. Therefore, it can be said that, in comparison with the frequency distribution of the output signal V, the frequency distribution of $\Delta V/N$ has a smaller number of pixels that are not able to be distinguished between a normal pixel and an abnormal pixel.

For example, the first specification unit 110 is capable of distinguishing between a normal pixel and an abnormal pixel by using a threshold value $Th_1$ in FIG. 3B. In this case, the second specification unit 120 distinguishes between a normal pixel and an abnormal pixel in a population that is pixels excluding a pixel specified as an abnormal pixel by the first specification unit 110.

Figure 3C:
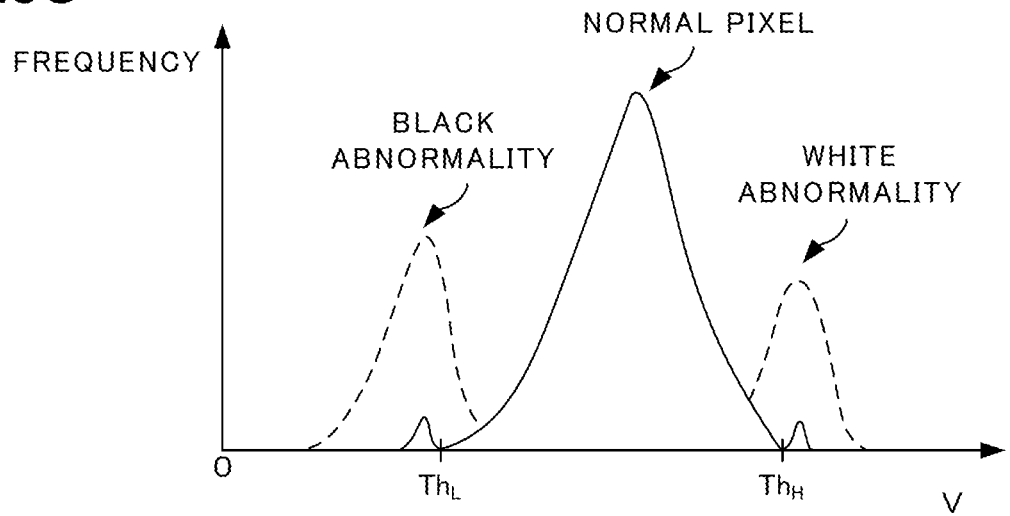
FIG. 3C illustrates another example of a frequency distribution indicating an output characteristic (V) of the image sensor.

FIG. 3C illustrates a frequency distribution of the output signal V of the image sensor exemplified in FIG. 3A. This frequency distribution (solid line) is different from the frequency distribution (dashed line) in FIG. 3A in that the frequency distribution of solid line is a frequency distribution in a population that is a plurality of pixels belonging to an image sensor excluding a pixel specified as an abnormal pixel by the first specification unit 110.

The frequency distribution of the output signal V, excluding the first abnormal pixel specified by the first specification unit 110, has no substantial change in frequency of normal pixels, but has smaller overlapping between a region of distribution of normal pixels and a region of distribution of white abnormalities or black abnormalities in comparison with the original frequency distribution (FIG. 3A) because frequency of abnormal pixels is reduced. Thus, in the frequency distribution of the output signal V excluding the first abnormal pixel specified by the first specification unit 110, it becomes possible to distinguish between a normal pixel and an abnormal pixel more easily in comparison with the original frequency distribution. A state of "smaller" overlapping described herein may include a state of no overlapping.

For example, the second specification unit 120 may consider a pixel whose output signal V is within a range from a threshold value $Th_L$ to a threshold value $Th_H$ to be a normal pixel, and may specify a pixel whose output signal V is otherwise as an abnormal pixel. In this case, a pixel whose output signal V is smaller than the threshold value $Th_L$ is a pixel of a black abnormality. A pixel whose output signal V exceeds the threshold value $Th_H$ is a pixel of a white abnormality.

As described above, the image processing device 100 according to the present example embodiment has a configuration of specifying an abnormal pixel in a stepwise fashion by using a plurality of methods. This configuration makes it possible to distinguish between a normal pixel and an abnormal pixel more easily in comparison with, for example, a case in which an abnormal pixel is specified by using only the second method without using the first method. Thus, the image processing device 100 is able to enhance accuracy in detection of an abnormal pixel.

According to the present example embodiment, it can be also said that specifying an abnormal pixel according to a plurality of methods means specifying an abnormal pixel in accordance with a plurality of determination criteria. Therefore, the image processing device 100 is able to detect, as an abnormal pixel, also a pixel including an abnormality that is not able to be specified merely by using a single method.

According to the present example embodiment, stepwise specification of an abnormal pixel is not limited to two-step specification as described above. In other words, the image processing device 100 may be configured in such a way as to specify an abnormal pixel in a stepwise fashion according to m (where m is an integer equal to or larger than 2) specification methods.

Figure 4:
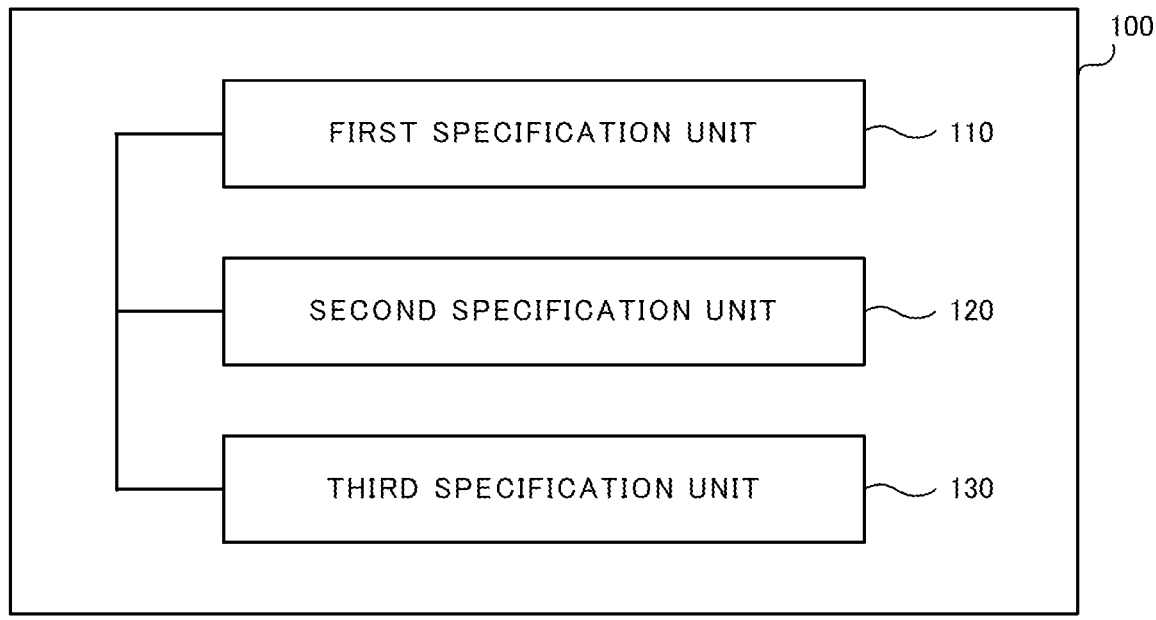
FIG. 4 is a block diagram illustrating another example of a configuration of the image processing device.

FIG. 4 is a block diagram illustrating another example of the configuration of the image processing device 100. The image processing device 100 includes a third specification unit 130, in addition to the first specification unit 110 and the second specification unit 120. The third specification unit 130 specifies an abnormal pixel according to a third method different from both of the first method and the second method. The image processing device 100 is not limited to the configurations in FIGS. 1 and 4, and may be configured to include more specification units according to different methods of specifying an abnormal pixel.

Second Example Embodiment

Figure 5:
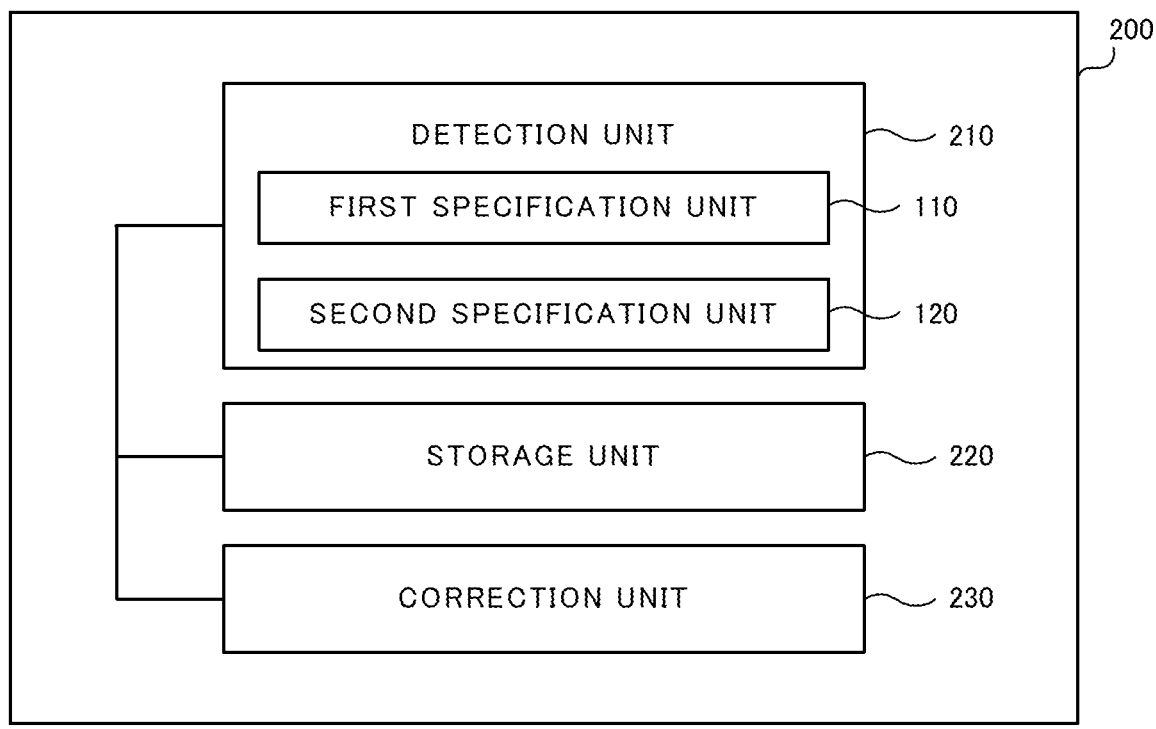
FIG. 5 is a block diagram illustrating still another example of a configuration of the image processing device.

FIG. 5 is a block diagram illustrating a configuration of an image processing device 200 according to another example embodiment. The image processing device 200 is configured to include a detection unit 210, a storage unit 220, and a correction unit 230.

In a subsequent example embodiment (and a subsequent modification example), a term already described in another example embodiment is used in a meaning similar to a meaning in the another example embodiment unless specifically stated otherwise. Redundant description relating to such a term is omitted accordingly.

The image processing device 200 includes common configurations with the image processing device 100 according to the first example embodiment. More specifically, the detection unit 210 includes a first specification unit 110 and a second specification unit 120. It can be also said that the detection unit 210 is equivalent to one example of the image processing device 100 according to the first example embodiment. In other words, the detection unit 210 detects an abnormal pixel in a predetermined image sensor.

The detection unit 210 records a position of an abnormal pixel in an image sensor. The detection unit 210 records a position of a first abnormal pixel specified by the first specification unit 110 and a position of a second abnormal pixel specified by the second specification unit 120. The detection unit 210 may record a position of a normal pixel instead of a position of an abnormal pixel. This is because a position of an abnormal pixel can be specified when a position of a normal pixel in an image sensor can be specified.

The storage unit 220 stores data indicating a position of an abnormal pixel. A position of each pixel constituting an image sensor can be expressed by using, for example, a two-dimensional rectangular coordinate system with a position of a predetermined pixel as a reference. For example, when an image is a rectangle, a reference position described herein is equivalent to any of vertices of the rectangle. The storage unit 220 may be configured to be attachable and detachable to and from the image processing device 200, or may be configured as a separate storage device from the image processing device 200.

The correction unit 230 corrects an output signal of an abnormal pixel. The correction unit 230 corrects an output signal of an abnormal pixel in such a way that the output signal approaches an output signal expected when the pixel is a normal pixel. Specifically, the correction unit 230 corrects an output signal of an abnormal pixel on the basis of output signals of one or more normal pixels in the vicinity of the pixel. The correction unit 230 may specify positions of a normal pixel and an abnormal pixel by referring to data stored in the storage unit 220.

The range of the "vicinity" described herein is not limited to a particular range. In other words, the range of the "vicinity" described herein is variable. In some cases, the range of the "vicinity" described herein depends on the number of normal pixels (or abnormal pixels) existing around the concerning abnormal pixel. For example, pixels in the vicinity of the abnormal pixel are selected in accordance with a predetermined rule using the abnormal pixel as a base.

Figure 6:
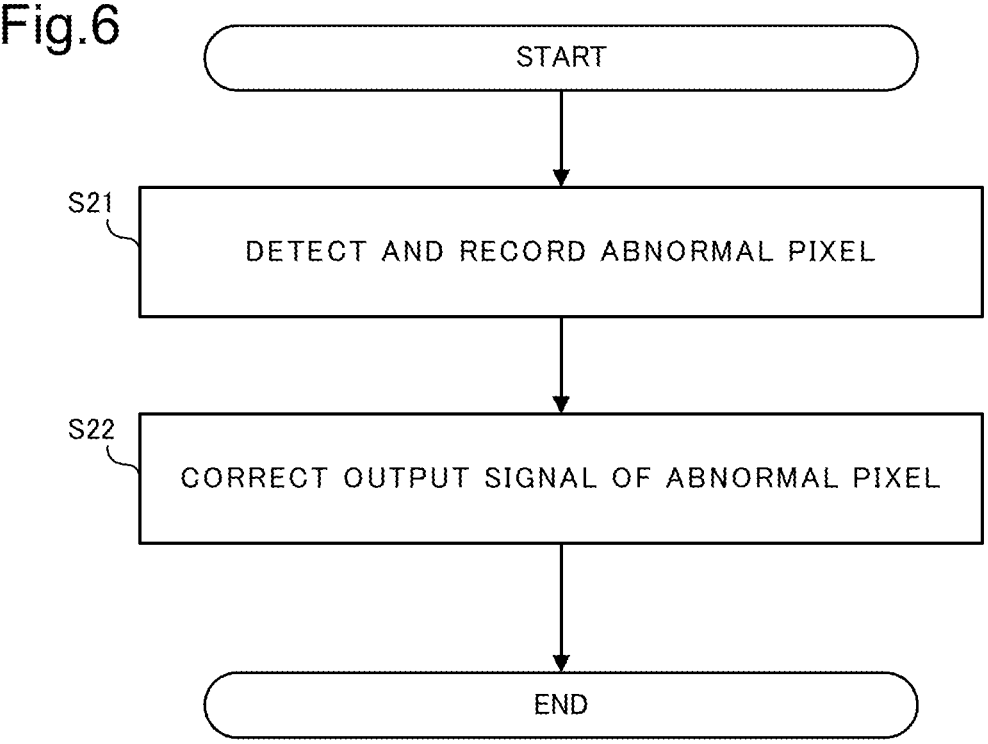
FIG. 6 is a flowchart illustrating another example of an operation of the image processing device.

FIG. 6 is a flowchart illustrating an operation of the image processing device 200. In Step S21, the detection unit 210 detects an abnormal pixel from a plurality of input pixels. The detection unit 210 may detect an abnormal pixel in a way similarly to the image processing device 100 according to the first example embodiment does. In other words, the detection unit 210 may detect an abnormal pixel in a stepwise fashion by using a plurality of methods. The detection unit 210 records data indicating a position of the abnormal pixel in the storage unit 220.

In Step S22, the correction unit 230 corrects an output signal of the abnormal pixel. The correction unit 230 specifies a target pixel of correction, that is, the abnormal pixel, by referring to the data stored in the storage unit 220. The correction unit 230 corrects the output signal of the abnormal pixel that is a target pixel of correction on the basis of output signals of normal pixels in the vicinity of the concerning pixel.

As described above, the image processing device 200 according to the present example embodiment includes common configurations with the image processing device 100 according to the first example embodiment. Thus, the image processing device 200 is able to enhance accuracy in detection of an abnormal pixel similarly to the image processing device 100.

The image processing device 200 has a configuration that corrects an output signal of a detected abnormal pixel on the basis of output signals of normal pixels in the vicinity. This configuration enhances accuracy in correction of an output signal of an abnormal pixel. Especially, it can be said that this configuration makes it possible to more accurately correct an output signal of an abnormal pixel when a ratio of abnormal pixels to a whole image associated with an image sensor is relatively high.

In general, when an output signal of a certain pixel is corrected on the basis of output signals of pixels in the vicinity of the certain pixel, positions and the number of the "pixels in the vicinity" described herein are determined in advance. However, when a ratio of abnormal pixels to a whole image is relatively high, there is a high possibility that another abnormal pixel exists around an abnormal pixel. When an output signal of an abnormal pixel is corrected on the basis of an output signal of another abnormal pixel, correction accuracy is deteriorated.

Meanwhile, the image processing device 200 is able to specify positions of a normal pixel and an abnormal pixel by referring to data stored in the storage unit 220, and thus, is able to exclude an abnormal pixel from the "pixels in the vicinity" described herein. The image processing device 200 is able to enhance correction accuracy, by correcting an output signal of an abnormal pixel by selectively referring to an output signal of a normal pixel in this way.

Third Example Embodiment

Figure 7:
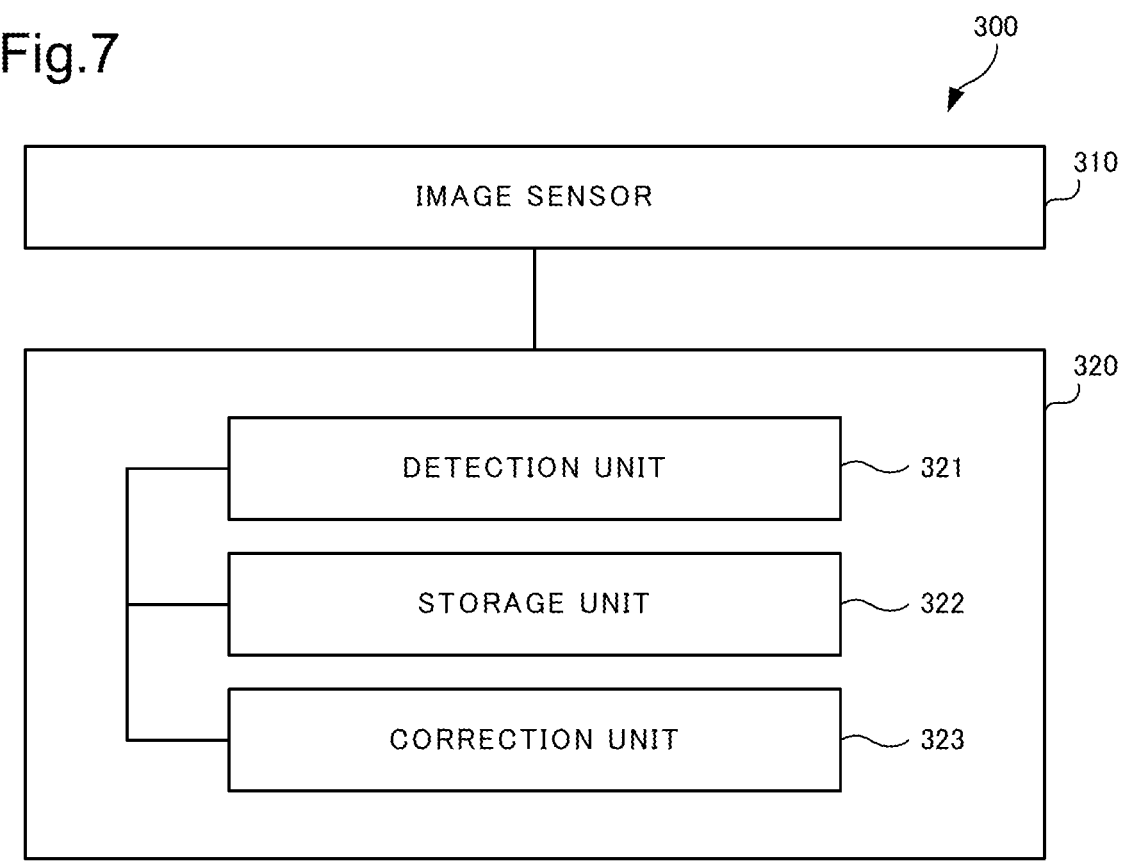
FIG. 7 is a block diagram illustrating one example of a configuration of a correction system.

FIG. 7 is a block diagram illustrating a configuration of a correction system 300 according to still another example embodiment. The correction system 300 includes an image sensor 310 and an image processing device 320. The image processing device 320 includes a detection unit 321, a storage unit 322, and a correction unit 323.

The image sensor 310 has a plurality of sensor elements, and supplies the image processing device 320 with an output signal according to incident light. An output from the image sensor 310 may include a plurality of abnormal pixels. For example, the image sensor 310 may be a product at a stage of performance evaluation, such as a trial product. In other words, it can be also said that the image sensor 310 is assumed to include an abnormal pixel (or many abnormal pixels) rather than include no abnormal pixel (or few abnormal pixels).

The image processing device 320 is equivalent to one example of the image processing device 200 according to the second example embodiment. Specifically, the detection unit 321, the storage unit 322, and the correction unit 323 have common configurations with the detection unit 210, the storage unit 220, and the correction unit 230. However, operations of the detection unit 321, the storage unit 322, and the correction unit 323 are partially different from operations of the detection unit 210, the storage unit 220, and the correction unit 230. The differences are mainly as follows.

The detection unit 321 specifies an abnormal pixel in a stepwise fashion by using two or more methods out of three specification methods. Specifically, the detection unit 321 is able to specify an abnormal pixel by using a method based on an S/N ratio, a method based on a difference $\Delta V$, and a method based on an output signal V. The S/N ratio described herein is equivalent to $\Delta V/N$ of the first example embodiment. In other words, the S/N ratio is a value acquired by dividing a difference between responses of the image sensor 310 to incident light from two individual surface light sources at different luminance levels by a noise in the sensor elements of the image sensor 310.

Figure 8A:
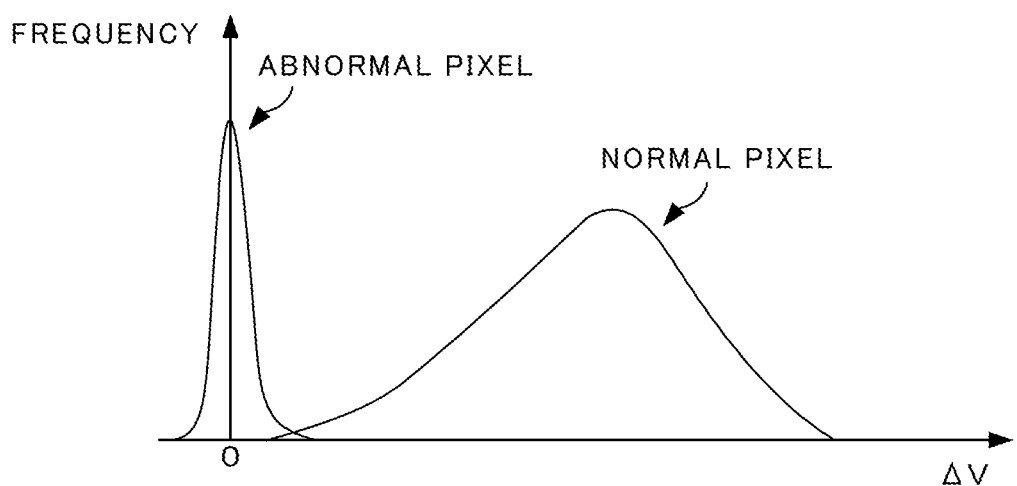
FIG. 8A illustrates one example of a frequency distribution indicating an output characteristic ($\Delta V$) of an image sensor.

FIG. 8A illustrates one example of a frequency distribution in a case where an output characteristic of an image sensor is represented by using the difference $\Delta V$ as a variate. A normal pixel indicates a response depending on a luminance difference between two surface light sources. In contrast, an abnormal pixel has poorer responsiveness to a luminance change of incident light in comparison with a normal pixel, and, in some cases, does not respond to a luminance change (that is, undergoes no change in output even upon a luminance change). Thus, the difference $\Delta V$ in abnormal pixels tends to be smaller than the difference $\Delta V$ in normal pixels, and may indicate a negative value. However, the difference $\Delta V$ in abnormal pixels and the difference $\Delta V$ in normal pixels have a certain level of variation, and thus, exhibit distributions with modes of mutually different values. Therefore, the frequency distribution of the difference $\Delta V$ is also a multimodal distribution similarly to the frequency distribution of the frequency distribution of the output signal V or the S/N ratio (that is, $\Delta V/N$) is.

Figure 8B:
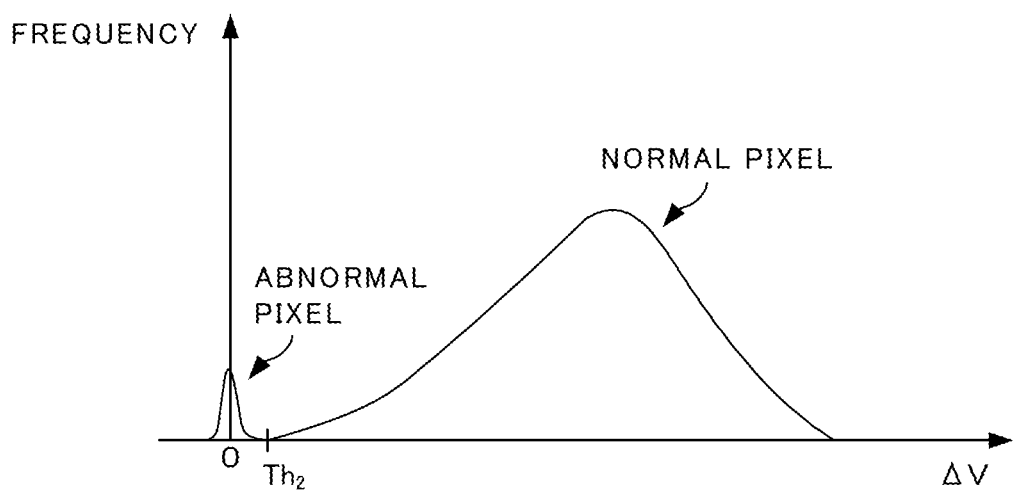
FIG. 8B illustrates another example of a frequency distribution indicating an output characteristic ($\Delta V$) of the image sensor.

FIG. 8B illustrates another example of the frequency distribution of the difference $\Delta V$. This example illustrates a frequency distribution in a case where an abnormal pixel specified by the method based on the S/N ratio is excluded. Thus, in the frequency distribution in FIG. 8B, frequency of a value attributable to an abnormal pixel is lowered in comparison with the frequency distribution in FIG. 8A. As a result, the frequency distribution of the difference $\Delta V$ has smaller overlapping of a plurality of distributions, and thus, it becomes possible to distinguish between a normal pixel and an abnormal pixel easily. For example, the detection unit 321 is able to distinguish between a normal pixel and an abnormal pixel by using a threshold value $Th_2$.

The order of methods regarding easiness in distinguishment between a normal pixel and an abnormal pixel is: the method based on the S/N ratio, the method based on the difference $\Delta V$, and the method based on the output signal V. In other words, among these methods, the method based on the S/N ratio is the most easy method of distinguishing between a normal pixel and an abnormal pixel. Meanwhile, among these methods, the method based on the output signal V is a most unlikely method of distinguishing between a normal pixel and an abnormal pixel. Here, the unlikeliness in distinguishing between a normal pixel and an abnormal pixel means that a region of distribution of normal pixels and a region of distribution of abnormal pixel are likely to overlap each other in a frequency distribution.

An abnormal pixel specified by using a certain specification method is not necessarily identical to an abnormal pixel specified by using another specification method. Abnormal pixels may include, for example, a pixel that is able to be specified by using the method based on the S/N ratio but is not able to be specified as an abnormal pixel by using the method based on the difference $\Delta V$. Similarly, abnormal pixels may include a pixel that is able to be specified by using the method based on the difference $\Delta V$ but is not able to be specified as an abnormal pixel by using the method based on the output signal V. Thus, the detection unit 321 uses a plurality of specification methods in combination and thereby enhances accuracy in detection of an abnormal pixel.

FIG. 9 exemplifies a procedure for specifying an abnormal pixel by using the detection unit 321. When all of the above-described three specification methods are used, the detection unit 321 specifies an abnormal pixel in this order: the method based on the S/N ratio, the method based on the difference ΔV, and the method based on the output signal V. In other words, the detection unit 321 specifies an abnormal pixel by applying the methods in order of the methods regarding easiness to distinguish between a normal pixel and an abnormal pixel. In this case, the method based on the S/N ratio corresponds to one example of the first method according to the first example embodiment. The method based on the difference ΔV corresponds to one example of the second method according to the first example embodiment. The method based on the output signal V corresponds to one example of the third method according to the first example embodiment.

When two methods out of the above-described three specification methods are used, the detection unit 321 specifies an abnormal pixel in any of the following orders.
(1) The order of the method based on the S/N ratio and the method based on the output signal V
(2) The order of the method based on the difference ΔV and the method based on the output signal V
(3) The order of the method based on the S/N ratio and the method based on the difference ΔV The method based on the S/N ratio in the case of (1) or (3) and the method based on the difference ΔV in the case of (2) correspond to one example of the first method according to the first example embodiment. The method based on the output signal V in the case of (1) or (2) and the method based on the difference ΔV in the case of (3) correspond to one example of the second method according to the first example embodiment.

Figure 10:
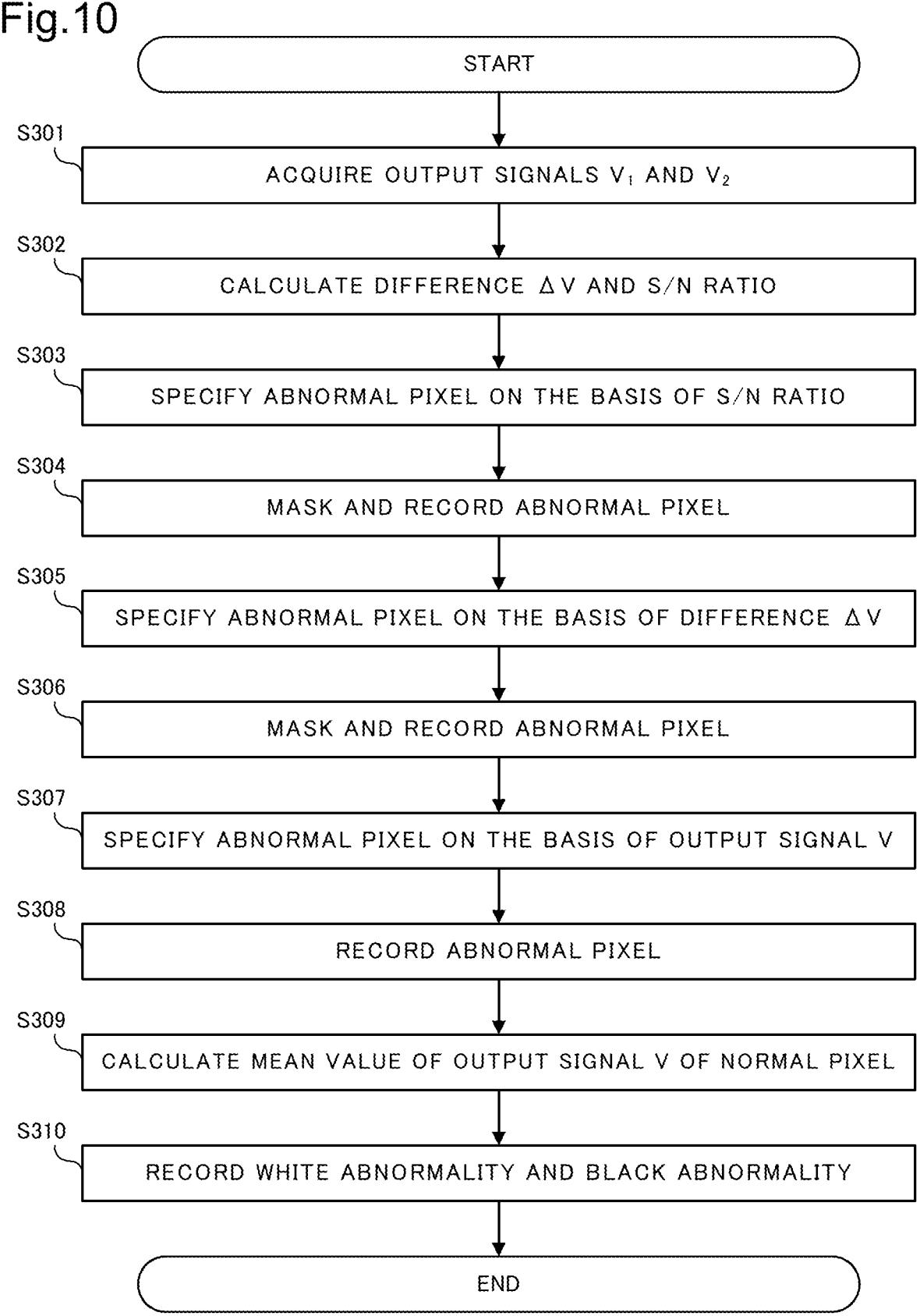
FIG. 10 is a flowchart illustrating one example of processing of detecting an abnormal pixel.

FIG. 10 is a flowchart illustrating processing of detecting an abnormal pixel. In this example, the detection unit 321 detects an abnormal pixel by using all of the above-described three specification methods. In Step S301, the detection unit 321 acquires output signals $V_1$ and $V_2$ from the image sensor 310. Each of the output signals $V_1$ and $V_2$ is a response by the image sensor 310 irradiated with incident light at a uniform luminance level. However, the output signals $V_1$ and $V_2$ are caused by incident light at different luminance levels. Here, a light source is at a higher luminance level when the output signal $V_1$ is output. Such incident light is irradiated by using, for example, a uniform standard light source.

In Step S302, the detection unit 321 calculates a difference V and an S/N ratio (ΔV/N) by using the output signals $V_1$ and $V_2$ acquired in Step S301. The difference ΔV is a value acquired by subtracting the output signal $V_2$ from the output signal $V_1$, and is calculated for each pixel. A noise N may be measured in advance before execution of detection processing.

In Step S303, the detection unit 321 specifies an abnormal pixel according to the method based on the S/N ratio. In Step S304, the detection unit 321 masks the abnormal pixel specified in Step S303, and records, in the storage unit 322, a position of the specified abnormal pixel. Masking described herein means excluding a concerning pixel in subsequent processing.

The detection unit 321 records, in the storage unit 322, the position of the abnormal pixel by using a predetermined coordinate system. Hereinafter, a position of an abnormal pixel is represented by using an x-component and a y-component of a two-dimensional rectangular coordinate system. Further, the image sensor 310 includes sensor elements arranged in a grid shape within a rectangle whose sides are parallel with the x-axis and the y-axis, respectively.

In Step S305, the detection unit 321 specifies an abnormal pixel according to the method based on the difference ΔV. At this time, the detection unit 321 calculates a frequency distribution of pixels other than the masked pixel (that is, the pixel specified as an abnormal pixel in Step S303). This makes it possible to distinguish between a normal pixel and an abnormal pixel easily, as exemplified in FIGS. 8A and 8B.

In Step S306, the detection unit 321 masks the abnormal pixel specified in Step S305, and records, in the storage unit 322, a position of the specified abnormal pixel. The processing of Step S306 is executed similarly to the processing of Step S304.

In Step S307, the detection unit 321 specifies an abnormal pixel according to the method based on the output signal V. At this time, the detection unit 321 calculates a frequency distribution by using, as the output signal V, either the output signals $V_1$ or $V_2$ acquired in Step S301. This makes it possible to distinguish between a normal pixel and an abnormal pixel easily, as exemplified in FIGS. 3A and 3C.

In Step S308, the detection unit 321 records, in the storage unit 322, a position of the abnormal pixel specified in Step S307.

In Step S309, the detection unit 321 calculates a mean value of the output signal V of normal pixels. More specifically, the detection unit 321 considers, to be normal pixels, pixels of the output signal V excluding the pixels recorded as abnormal pixels in Steps S304, S306, and S308, and calculates a mean value of the output signal V.

In Step S310, the detection unit 321 records, in the storage unit 322, which of a white abnormality and a black abnormality an abnormal pixel is. At this time, the detection unit 321 compares the output signal V of abnormal pixels with the mean value calculated in Step S309, and determines an abnormal pixel whose output signal V is larger than the mean value as a white abnormality and an abnormal pixel whose output signal V is smaller than the mean value as a black abnormality.

Steps S309 and S310 are not compulsory for processing of detecting an abnormal pixel. Executing Steps S309 and S310 makes it possible to specify which of a white abnormality and a black abnormality an abnormal pixel is. When it is possible to specify which of a white abnormality and a black abnormality an abnormal pixel is, a specification result can be used in evaluation of the image sensor 310.

Figure 11:
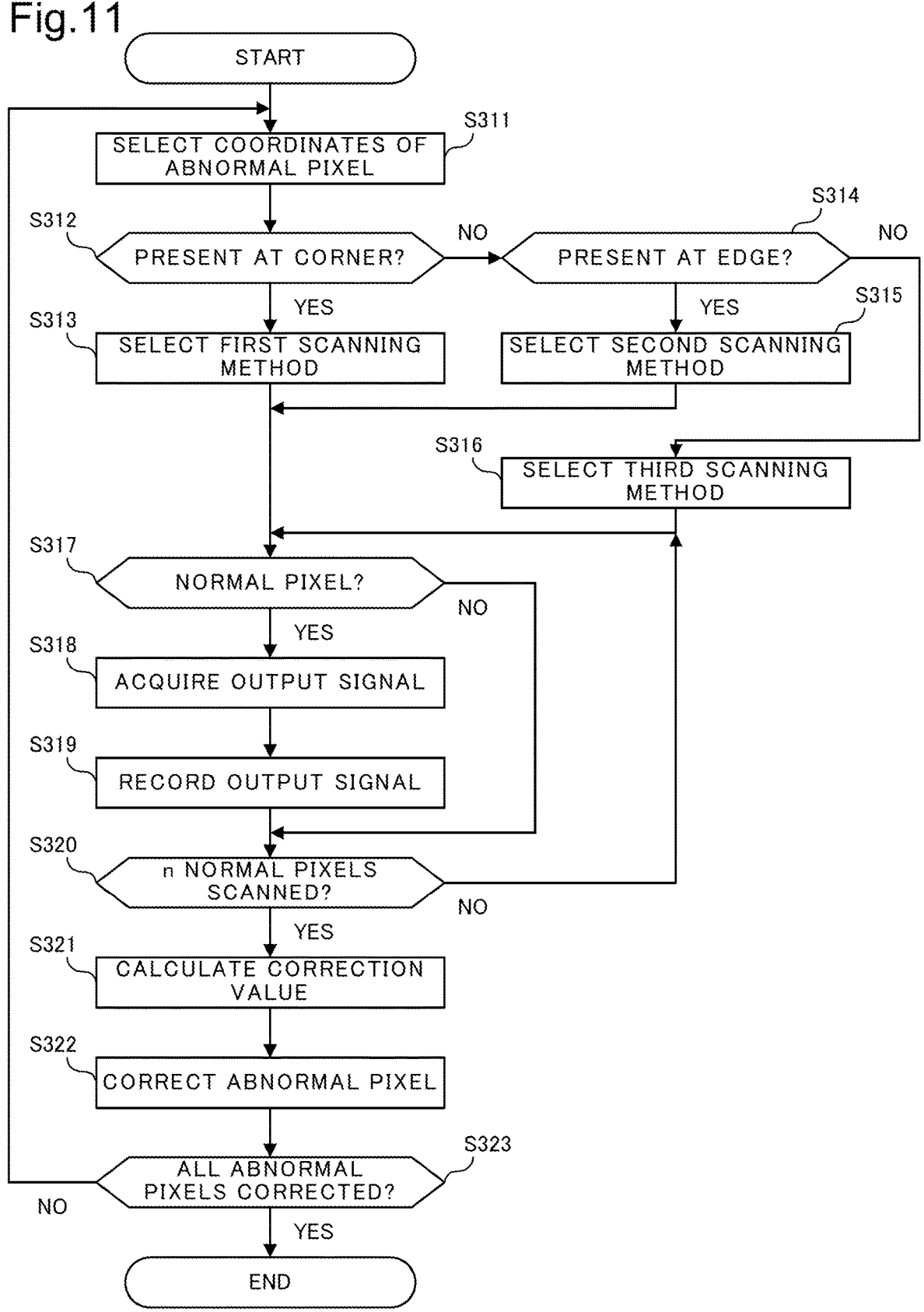
FIG. 11 is a flowchart illustrating one example of processing of correcting an abnormal pixel.

FIG. 11 is a flowchart illustrating processing of correcting an abnormal pixel. On the basis of a result of execution of detection processing, the correction unit 323 executes the following correction processing on an output signal representing an image captured by the image sensor 310.

In Step S311, the correction unit 323 selects coordinates of any of abnormal pixels. The correction unit 323 specifies coordinates indicating a position of an abnormal pixel, by referring to data stored in the storage unit 322. The correction unit 323 specifies coordinates of an abnormal pixel in predetermined order (for example, ascending order or descending order).

In Step S312, the correction unit 323 determines whether the coordinates selected in Step S311 correspond to a corner of the image. More specifically, the correction unit 323 determines whether the coordinates acquired in Step S311 correspond to any of the following. In other words, a corner described herein indicates a pixel that satisfies any of the following: "The x-component and the y-component are both minimum", "The x-component is minimum and the y-component is maximum", "The x-component is maximum and the y-component is minimum", and "The x-component and the y-component are both maximum".

When the coordinates selected in Step S311 correspond to a corner of the image (S312: YES), the correction unit 323 executes Step S313. In Step S313, the correction unit 323 scans pixels in the vicinity of the abnormal pixel according to a first scanning method.

Meanwhile, when the coordinates selected in Step S311 do not correspond to a corner of the image (S312: NO), the correction unit 323 executes Step S314. In Step S314, the correction unit 323 determines whether the coordinates selected in Step S311 correspond to an edge of the image.

More specifically, the correction unit 323 determines whether the coordinates acquired in Step S311 correspond to any of the following. In other words, an edge described herein indicates, among pixels not corresponding to a corner, a pixel that satisfies any of the following: "The x-component is minimum", "The x-component is maximum", "The y-component is minimum", and "The y-component is maximum".

When the coordinates selected in Step S311 correspond to an edge of the image (S314: YES), the correction unit 323 executes Step S315. In Step S315, the correction unit 323 scans pixels in the vicinity of the abnormal pixel according to a second scanning method.

Meanwhile, when the coordinates selected in Step S311 do not correspond to an edge of the image (S314: NO), the correction unit 323 executes Step S316. In Step S316, the correction unit 323 scans pixels in the vicinity of the abnormal pixel according to a third scanning method.

Figure 12A:
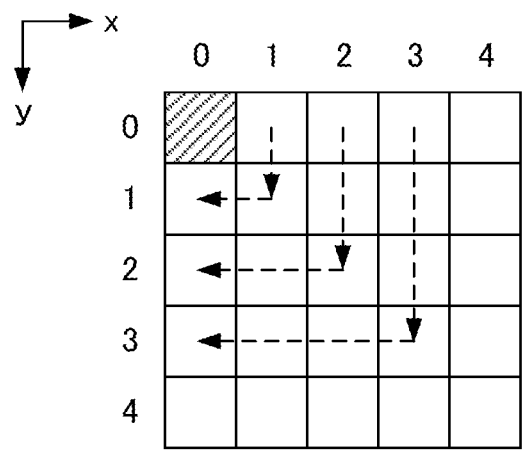
FIG. 12A illustrates one example of a pixel scanning method.
Figure 12B:
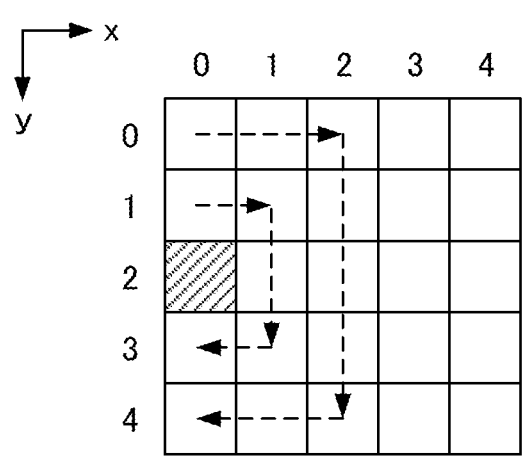
FIG. 12B illustrates another example of a pixel scanning method.
Figure 12C:
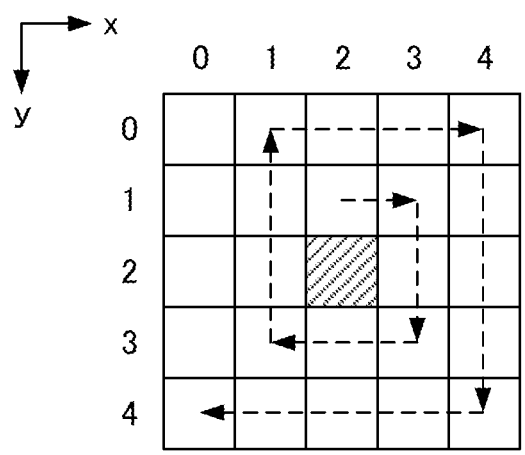
FIG. 12C illustrates still another example of a pixel scanning method.

FIGS. 12A, 12B, and 12C illustrate examples of a pixel scanning method. In these figures, a hatched pixel indicates an abnormal pixel that is a target of correction. FIG. 12A illustrates the first scanning method. FIG. 12B illustrates the second operation method. FIG. 12C illustrates the third operation method.

When an abnormal pixel is present at coordinates (0, 0) as exemplified in FIG. 12A, the correction unit 323 scans pixels in the following order: coordinates (1, 0), coordinates (1, 1), coordinates (0, 1), coordinates (2, 0), coordinates (2, 1), . . . . The correction unit 323 scans pixels one by one in this way, until a predetermined number of normal pixels are scanned.

When an abnormal pixel is present at coordinates (0, 2) as exemplified in FIG. 12B, the correction unit 323 scans pixels in the following order: coordinates (0, 1), coordinates (1, 1), coordinates (1, 2), coordinates (1, 3), coordinates (0, 3), coordinates (0, 0), coordinates (1, 0), . . . . The correction unit 323 scans pixels one by one in this way, until a predetermined number of normal pixels are scanned.

When an abnormal pixel is present at coordinates (2, 2) as exemplified in FIG. 12C, the correction unit 323 scans pixels in the following order: coordinates (2, 1), coordinates (3, 1), coordinates (3, 2), coordinates (3, 3), coordinates (2, 3), coordinates (1, 3), coordinates (1, 2), . . . . The correction unit 323 scans pixels one by one in this way, until a predetermined number of normal pixels are scanned.

In Step S317, the correction unit 323 determines whether a scanned pixel is a normal pixel. When a scanned pixel is a normal pixel (S317: YES), the correction unit 323 acquires an output signal of the pixel in Step S318. In Step S319, the correction unit 323 records, in the storage unit 322, the output signal acquired in Step S318.

Meanwhile, when a scanned pixel is not a normal pixel (S317: NO), the correction unit 323 skips Steps S318 and S319. In other words, in this case, the correction unit 323 does not record an output signal.

In Step S320, the correction unit 323 determines whether the number of scanned normal pixels reaches a predetermined threshold value (denoted herein by "n".). The correction unit 323 is able to determine the number of scanned normal pixels on the basis of the number of times that Steps S318 and S319 are executed. The number of scanned normal pixels is equal to the number of times that an output signal is recorded.

When the number of scanned normal pixels is smaller than n (S320: NO), the correction unit 323 continues scanning of pixels. In other words, the correction unit 323 repeats the processing of Step S317 and thereafter, while shifting a position of a pixel to be scanned. A pixel scanning method in this case may be different depending on coordinates of an abnormal pixel, as exemplified in FIGS. 12A to 12C.

When the number of scanned normal pixels reaches n (S320: YES), the correction unit 323 calculates a correction value for the abnormal pixel in Step S321. In this step, the correction unit 323 calculates a correction value on the basis of the output signals of the n normal pixels stored in the storage unit 322.

A correction value is, for example, a mean value of the output signals of the n normal pixels. However, a specific method of calculating a correction value is not limited to a method of calculating such a simple mean value, and may be a method of calculating a weighted mean value depending on a distance between an abnormal pixel and a normal pixel. Alternatively, the correction unit 323 may change a method of calculating a correction value depending on whether an abnormal pixel is a white abnormality or a black abnormality.

In Step S322, the correction unit 323 corrects an output signal of the abnormal pixel at the coordinates selected in Step S311. For example, the correction unit 323 replaces the output signal of the abnormal pixel with the correction value calculated in Step S321. Alternatively, the correction unit 323 may add or subtract, to or from the output signal of the abnormal pixel, a value depending on the correction value calculated in Step S321.

In Step S323, the correction unit 323 determines whether all the abnormal pixels have been corrected. In other words, the correction unit 323 determines whether the above-described correction has been executed on all of the abnormal pixels stored in the storage unit 322. When there is an uncorrected abnormal pixel (S323: NO), the correction unit 323 again executes the processing of Step S311 and thereafter. Specifically, the correction unit 323 selects coordinates of an uncorrected abnormal pixel in Step S311, and executes the processing of Step S312 and thereafter. Then, when all the abnormal pixels have been corrected (S323: YES), the correction unit 323 ends the correction processing.

As described above, the correction system 300 according to the present example embodiment includes common configurations with the image processing device 100 according to the first example embodiment or the image processing device 200 according to the second example embodiment. Thus, the correction system 300 is able to enhance accuracy in detection of an abnormal pixel, similarly to the image processing devices 100 and 200.

The correction system 300 has a configuration to correct an output signal of an abnormal pixel detected from the image sensor 310. Even when the image sensor 310 includes an abnormal pixel, the correction system 300 can accurately correct an output signal attributable to the abnormal pixel, that is, an output signal different from a true value.

Modification Example

For example, modifications as follows can be applied to the above-described first to third example embodiments. These modification examples can be also used appropriately in combination as needed.

(1) As described above, an image sensor may be a sensor having sensitivity to invisible light. For example, an image sensor may be an infrared sensor sensing infrared light.

When an infrared sensor is used as an image sensor, an S/N ratio can be replaced with a noise-equivalent temperature difference (NETD). Here, the NETD can be described as $N/(\Delta V/T)$. However, $\Delta T$ represents an intensity difference (i.e. temperature difference) between two types of incident light used in calculation of $\Delta V$.

The NETD is proportional to a reciprocal of the S/N ratio. Thus, in a frequency distribution based on the NETD, a distribution curve for normal pixels and a distribution curve for abnormal pixels are located inversely to those of the frequency distribution based on the S/N ratio (see FIG. 3B). In the frequency distribution based on the NETD, a distribution curve for normal pixels is shifted to a left side (i.e. a smaller-value side) of a distribution curve for abnormal pixels. Similarly to the frequency distribution based on the S/N ratio, the frequency distribution based on the NETD has smaller overlapping between a region of distribution of normal pixels and a region of distribution of abnormal pixels in comparison with the frequency distribution based on the difference $\Delta V$ or the frequency distribution based on the output signal V, and thus, it is easy to distinguish between a normal pixel and an abnormal pixel.

(2) A specific hardware configuration of the devices (the image processing devices 100, 200, and 320) according to the example embodiments of the present invention may be any one of various variations, and is not limited to a particular configuration. For example, the devices according to the example embodiments of the present invention may be implemented by using software, or may be configured to use a plurality of pieces of hardware and allocate various types of processing to the plurality of pieces of hardware.

Figure 13:
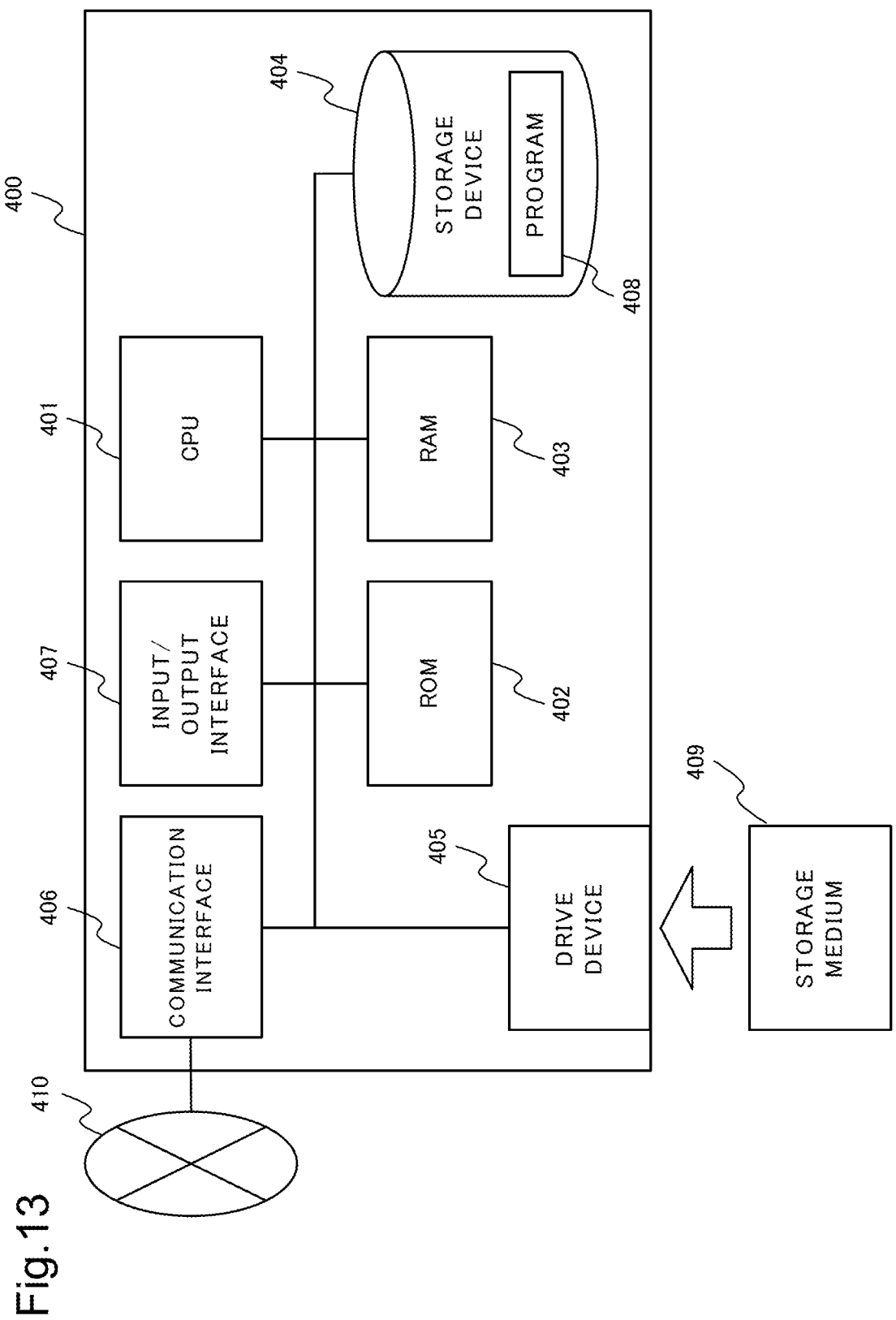
FIG. 13 is a block diagram illustrating one example of a hardware configuration of a computer device.

FIG. 13 is a block diagram illustrating an example of a hardware configuration of a computer device 400 that achieves the devices according to the example embodiments of the present invention. The computer device 400 is configured to include a central processing unit (CPU) 401, a read only memory (ROM) 402, a random access memory (RAM) 403, a storage device 404, a drive device 405, a communication interface 406, and an input/output interface 407.

The CPU 401 executes a program 408 by using the RAM 403. The communication interface 406 exchanges data with an external device via a network 410. The input/output interface 407 exchanges data with peripheral equipment (an input device, a display device, and the like). The communication interface 406 and the input/output interface 407 can function as components for acquiring or outputting data.

The program 408 may be stored on the ROM 402. The program 408 may be recorded on a recording medium 409 such as a memory card and be read out by the drive device 405, or may be transmitted from an external device via the network 410.

The devices according to the present disclosure may be implemented by the configuration (or a part thereof) illustrated in FIG. 13. For example, in the case of the image processing device 100, the first specification unit 110 and the second specification unit 120 correspond to the CPU 401, the ROM 402, and the RAM 403. In the case of the image processing device 200, the detection unit 210 and the correction unit 230 correspond to the CPU 401, the ROM 402, and the RAM 403, and the storage unit 220 corresponds to the RAM 403 or the storage device 404.

The components of the devices according to the example embodiments of the present invention may be implemented as a single circuitry (i.e. a processor or the like), or may be implemented as a combination of a plurality of circuitries. A circuitry described herein may be either of a dedicated circuitry or a general-purpose circuitry. For example, the devices according to the present disclosure may have a part implemented as a dedicated processor and may have another part implemented as a general-purpose processor.

[Supplementary Note]

Some or all parts of the present invention may be described as the following supplementary notes. However, the present invention is not necessarily limited to the modes of the supplementary notes.

(Supplementary Note 1)

An image processing device including:

first specification means for specifying an abnormal pixel from a plurality of pixels according to a first method; and second specification means for specifying an abnormal pixel, from the plurality of pixels excluding the abnormal pixel specified by the first specification means, according to a second method different from the first method.

(Supplementary Note 2)

The image processing device according to claim 1, wherein the first method specifies the abnormal pixel, based on a frequency distribution in which a characteristic of the plurality of pixels is represented by using a first variate, and the second method specifies the abnormal pixel, based on a frequency distribution in which a characteristic of the plurality of pixels excluding the abnormal pixel specified by the first specification means is represented by using a second variate different from the first variate.

(Supplementary Note 3)

The image processing device according to claim 2, wherein the frequency distribution in which the characteristic of the plurality of pixels is represented by using the first variate and the frequency distribution in which the characteristic of the plurality of pixels is represented by using the second variate have a plurality of peaks of frequency, and the frequency distribution in which the characteristic of the plurality of pixels is represented by using the first variate has a smaller overlapping region of distributions in comparison with the frequency distribution in which the characteristic of the plurality of pixels is represented by using the second variate.

(Supplementary Note 4)

The image processing device according to any one of claims 1 to 3, wherein the first method specifies the abnormal pixel by using a ratio based on an output signal and a noise of the plurality of pixels, and the second method specifies the abnormal pixel by using an output signal of the plurality of pixels.

(Supplementary Note 5)

The image processing device according to any one of claims 1 to 3, wherein the first method specifies the abnormal pixel by using a difference between an output signal in a case where a plurality of sensor elements associated with the plurality of pixels are irradiated with incident light at a first intensity and an output signal in a case where the plurality of sensor elements are irradiated with incident light at a second intensity, and the second method specifies the abnormal pixel by using an output signal of the plurality of pixels.

(Supplementary Note 6)

The image processing device according to any one of claims 1 to 3, wherein the first method specifies the abnormal pixel by using a ratio based on an output signal and a noise of the plurality of pixels, and the second method specifies the abnormal pixel by using a difference between an output signal in a case where a plurality of sensor elements associated with the plurality of pixels are irradiated with incident light at a first intensity and an output signal in a case where the plurality of sensor elements are irradiated with incident light at a second intensity.

(Supplementary Note 7)

The image processing device according to any one of claims 1 to 6, further including correction means for correcting an output signal of the abnormal pixel specified by the first specification means or the second specification means, based on an output signal of a pixel in a vicinity of the abnormal pixel, the pixel not being an abnormal pixel.

(Supplementary Note 8)

The image processing device according to claim 7, further including storage means for storing a position of the abnormal pixel specified by the first specification means or the second specification means, wherein the correction means specifies, based on the position stored in the storage means, the pixel that is not an abnormal pixel.

(Supplementary Note 9)

The image processing device according to any one of claims 1 to 8, further including third specification means for specifying an abnormal pixel, from the plurality of pixels excluding the abnormal pixel specified by the first specification means or the second specification means, according to a third method different from both of the first method and the second method.

(Supplementary Note 10)

The image processing device according to claim 9, wherein the first method specifies the abnormal pixel by using a ratio based on an output signal and a noise of the plurality of pixels, the second method specifies the abnormal pixel by using a difference between an output signal in a case where a plurality of sensor elements associated with the plurality of pixels are irradiated with incident light at a first intensity and an output signal in a case where the plurality of sensor elements are irradiated with incident light at a second intensity, and the third method specifies an abnormal pixel by using an output signal of the plurality of pixels.

(Supplementary Note 11)

An image processing method including:

specifying an abnormal pixel from a plurality of pixels according to a first method; and specifying an abnormal pixel, from the plurality of pixels excluding the specified abnormal pixel, according to a second method different from the first method.

(Supplementary Note 12)

The image processing method according to claim 11, wherein the first method specifies the abnormal pixel, based on a frequency distribution in which a characteristic of the plurality of pixels is represented by using a first variate, and the second method specifies the abnormal pixel, based on a frequency distribution in which a characteristic of the plurality of pixels excluding the abnormal pixel specified by the first specification method is represented by using a second variate different from the first variate.

(Supplementary Note 13)

The image processing method according to claim 12, wherein the frequency distribution in which the characteristic of the plurality of pixels is represented by using the first variate and the frequency distribution in which the characteristic of the plurality of pixels is represented by using the second variate have a plurality of peaks of frequency, and the frequency distribution in which the characteristic of the plurality of pixels is represented by using the first variate has a smaller overlapping region of distributions in comparison with the frequency distribution in which the characteristic of the plurality of pixels is represented by using the second variate.

(Supplementary Note 14)

The image processing method according to any one of claims 11 to 13, wherein the first method specifies the abnormal pixel by using a ratio based on an output signal and a noise of the plurality of pixels, and the second method specifies the abnormal pixel by using an output signal of the plurality of pixels.

(Supplementary Note 15)

The image processing method according to any one of claims 11 to 13, wherein the first method specifies the abnormal pixel by using a difference between an output signal in a case where a plurality of sensor elements associated with the plurality of pixels are irradiated with incident light at a first intensity and an output signal in a case where the plurality of sensor elements are irradiated with incident light at a second intensity, and the second method specifies the abnormal pixel by using an output signal of the plurality of pixels.

(Supplementary Note 16)

The image processing method according to any one of claims 11 to 13, wherein the first method specifies the abnormal pixel by using a ratio based on an output signal and a noise of the plurality of pixels, and the second method specifies the abnormal pixel by using a difference between an output signal in a case where a plurality of sensor elements associated with the plurality of pixels are irradiated with incident light at a first intensity and an output signal in a case where the plurality of sensor elements are irradiated with incident light at a second intensity.

(Supplementary Note 17)

The image processing method according to any one of claims 11 to 16, further including correcting an output signal of the specified abnormal pixel, based on an output signal of a pixel in a vicinity of the abnormal pixel, the pixel not being an abnormal pixel.

(Supplementary Note 18)

The image processing method according to claim 17, wherein the correcting includes specifying, based on a position stored in storage means storing the position of the specified abnormal pixel, the pixel that is not an abnormal pixel.

(Supplementary Note 19)

The image processing method according to any one of claims 11 to 18, further including specifying an abnormal pixel, from the plurality of pixels excluding the specified abnormal pixel, according to a third method different from both of the first method and the second method.

(Supplementary Note 20)

The image processing method according to claim 19, wherein the first method specifies the abnormal pixel by using a ratio based on an output signal and a noise of the plurality of pixels, the second method specifies the abnormal pixel by using a difference between an output signal in a case where a plurality of sensor elements associated with the plurality of pixels are irradiated with incident light at a first intensity and an output signal in a case where the plurality of sensor elements are irradiated with incident light at a second intensity, and the third method specifies an abnormal pixel by using an output signal of the plurality of pixels.

(Supplementary Note 21)

A storage medium storing a program causing a computer to execute: first specification processing of specifying an abnormal pixel from a plurality of pixels according to a first method; and second specification processing of specifying an abnormal pixel, from the plurality of pixels excluding the abnormal pixel specified by the first specification processing, according to a second method different from the first method.

(Supplementary Note 22)

The storage medium according to claim 21, wherein the first method specifies the abnormal pixel, based on a frequency distribution in which a characteristic of the plurality of pixels is represented by using a first variate, and the second method specifies the abnormal pixel, based on a frequency distribution in which a characteristic of the plurality of pixels excluding the abnormal pixel specified by the first specification processing is represented by using a second variate different from the first variate.

(Supplementary Note 23)

The storage medium according to claim 22, wherein the frequency distribution in which the characteristic of the plurality of pixels is represented by using the first variate and the frequency distribution in which the characteristic of the plurality of pixels is represented by using the second variate have a plurality of peaks of frequency, and the frequency distribution in which the characteristic of the plurality of pixels is represented by using the first variate has a smaller overlapping of distributions in comparison with the frequency distribution in which the characteristic of the plurality of pixels is represented by using the second variate.

(Supplementary Note 24)

The storage medium according to any one of claims 21 to 23, wherein the first method specifies the abnormal pixel by using a ratio based on an output signal and a noise of the plurality of pixels, and the second method specifies the abnormal pixel by using an output signal of the plurality of pixels.

(Supplementary Note 25)

The storage medium according to any one of claims 21 to 23, wherein the first method specifies the abnormal pixel by using a difference between an output signal in a case where a plurality of sensor elements associated with the plurality of pixels are irradiated with incident light at a first intensity and an output signal in a case where the plurality of sensor elements are irradiated with incident light at a second intensity, and the second method specifies the abnormal pixel by using an output signal of the plurality of pixels.

(Supplementary Note 26)

The storage medium according to any one of claims 21 to 23, wherein the first method specifies the abnormal pixel by using a ratio based on an output signal and a noise of the plurality of pixels, and the second method specifies the abnormal pixel by using a difference between an output signal in a case where a plurality of sensor elements associated with the plurality of pixels are irradiated with incident light at a first intensity and an output signal in a case where the plurality of sensor elements are irradiated with incident light at a second intensity.

(Supplementary Note 27)

The storage medium according to any one of claims 21 to 26, the program causing a computer to further execute correction processing of correcting an output signal of the abnormal pixel specified by the first specification processing or the second specification processing, based on an output signal of a pixel in a vicinity of the abnormal pixel, the pixel not being an abnormal pixel.

(Supplementary Note 28)

The storage medium according to claim 27, wherein the correction processing specifies, based on a position stored in storage means storing the position of the abnormal pixel specified by the first specification processing or the second specification processing, the pixel that is not an abnormal pixel.

(Supplementary Note 29)

The storage medium according to any one of claims 21 to 28, the program causing a computer to further execute third specification processing of specifying an abnormal pixel, from the plurality of pixels excluding the abnormal pixel specified by the first specification processing or the second specification processing, according to a third method different from both of the first method and the second method.

(Supplementary Note 30)

The storage medium according to claim 29, wherein the first method specifies the abnormal pixel by using a ratio based on an output signal and a noise of the plurality of pixels, the second method specifies the abnormal pixel by using a difference between an output signal in a case where a plurality of sensor elements associated with the plurality of pixels are irradiated with incident light at a first intensity and an output signal in a case where the plurality of sensor elements are irradiated with incident light at a second intensity, and the third method specifies an abnormal pixel by using an output signal of the plurality of pixels.

The present invention has been described by using the above-described example embodiments and modification examples as exemplary examples. However, the present invention is not limited to these example embodiments and modification examples. The present invention may include an example embodiment to which various modifications or applications that can be understood by a so-called person skilled in the art are applied within the scope of the present invention. The present invention can include an example embodiment made by appropriately combining or replacing the matters described herein as needed. For example, a matter described by using a particular example embodiment may be applied also to another example embodiment within the range of not causing any inconsistencies.

REFERENCE SIGNS LIST 100, 200, 320 Image processing device
110 First specification unit
120 Second specification unit
130 Third specification unit
210, 321 Detection unit
220, 322 Storage unit
230, 323 Correction unit
300 Correction system
310 Image sensor
400 Computer device

The invention claimed is:

1. An image processing device comprising:
at least one memory storing a set of instructions; and
at least one processor configured to execute the set of instructions to:
specify an abnormal pixel from a plurality of pixels according to a first method; and
specify an abnormal pixel, from the plurality of pixels excluding the abnormal pixel specified by the first method, according to a second method different from the first method, wherein
the first method specifies the abnormal pixel, based on a frequency distribution in which a characteristic of the plurality of pixels is represented by using a first variate,
the second method specifies the abnormal pixel, based on a frequency distribution in which a characteristic of the plurality of pixels excluding the abnormal pixel specified by the first method is represented by using a second variate different from the first variate,
the frequency distribution in which the characteristic of the plurality of pixels is represented by using the first variate and the frequency distribution in which the characteristic of the plurality of pixels is represented by using the second variate have a plurality of peaks of frequency, and
the frequency distribution in which the characteristic of the plurality of pixels is represented by using the first variate has a smaller overlapping region of distributions in comparison with the frequency distribution in which the characteristic of the plurality of pixels is represented by using the second variate.

2. The image processing device according to claim 1, wherein
the first method specifies the abnormal pixel by using a ratio based on an output signal and a noise of the plurality of pixels, and
the second method specifies the abnormal pixel by using an output signal of the plurality of pixels.

3. The image processing device according to claim 1, wherein
the first method specifies the abnormal pixel by using a difference between an output signal in a case where a plurality of sensor elements associated with the plurality of pixels are irradiated with incident light at a first intensity and an output signal in a case where the plurality of sensor elements are irradiated with incident light at a second intensity, and
the second method specifies the abnormal pixel by using an output signal of the plurality of pixels.

4. The image processing device according to claim 1, wherein
the first method specifies the abnormal pixel by using a ratio based on an output signal and a noise of the plurality of pixels, and
the second method specifies the abnormal pixel by using a difference between an output signal in a case where a plurality of sensor elements associated with the plurality of pixels are irradiated with incident light at a first intensity and an output signal in a case where the plurality of sensor elements are irradiated with incident light at a second intensity.

5. The image processing device according to claim 1, wherein
the at least one processor is configured to execute the set of instructions to:
correct an output signal of the abnormal pixel specified by the first method or the second method, based on an output signal of a pixel in a vicinity of the abnormal pixel, the pixel not being an abnormal pixel.

6. The image processing device according to claim 5, wherein
the at least one memory stores a position of the abnormal pixel specified by the first method or the second method, and
the at least one processor is configured to execute the set of instructions to specify, based on the position stored in the memory, the pixel that is not an abnormal pixel.

7. The image processing device according to claim 1, wherein
the at least one processor is configured to execute the set of instructions to:
specify an abnormal pixel, from the plurality of pixels excluding the abnormal pixel specified by the first method or the second method, according to a third method different from both of the first method and the second method.

8. The image processing device according to claim 7, wherein
the first method specifies the abnormal pixel by using a ratio based on an output signal and a noise of the plurality of pixels,
the second method specifies the abnormal pixel by using a difference between an output signal in a case where a plurality of sensor elements associated with the plurality of pixels are irradiated with incident light at a first intensity and an output signal in a case where the plurality of sensor elements are irradiated with incident light at a second intensity, and
the third method specifies an abnormal pixel by using an output signal of the plurality of pixels.

9. An image processing method comprising:
specifying an abnormal pixel from a plurality of pixels according to a first method; and
specifying an abnormal pixel, from the plurality of pixels excluding the specified abnormal pixel, according to a second method different from the first method, wherein
the first method specifies the abnormal pixel, based on a frequency distribution in which a characteristic of the plurality of pixels is represented by using a first variate, and
the second method specifies the abnormal pixel, based on a frequency distribution in which a characteristic of the plurality of pixels excluding the abnormal pixel specified by the first specification method is represented by using a second variate different from the first variate, the frequency distribution in which the characteristic of the plurality of pixels is represented by using the first variate and the frequency distribution in which the characteristic of the plurality of pixels is represented by using the second variate have a plurality of peaks of frequency, and the frequency distribution in which the characteristic of the plurality of pixels is represented by using the first variate has a smaller overlapping region of distributions in comparison with the frequency distribution in which the characteristic of the plurality of pixels is represented by using the second variate.

10. The image processing method according to claim 9, wherein the first method specifies the abnormal pixel by using a ratio based on an output signal and a noise of the plurality of pixels, and the second method specifies the abnormal pixel by using an output signal of the plurality of pixels.

11. The image processing method according to claim 9, wherein the first method specifies the abnormal pixel by using a difference between an output signal in a case where a plurality of sensor elements associated with the plurality of pixels are irradiated with incident light at a first intensity and an output signal in a case where the plurality of sensor elements are irradiated with incident light at a second intensity, and the second method specifies the abnormal pixel by using an output signal of the plurality of pixels.

12. The image processing method according to claim 9, wherein the first method specifies the abnormal pixel by using a ratio based on an output signal and a noise of the plurality of pixels, and the second method specifies the abnormal pixel by using a difference between an output signal in a case where a plurality of sensor elements associated with the plurality of pixels are irradiated with incident light at a first intensity and an output signal in a case where the plurality of sensor elements are irradiated with incident light at a second intensity.

13. The image processing method according to claim 9, further comprising correcting an output signal of the specified abnormal pixel, based on an output signal of a pixel in a vicinity of the abnormal pixel, the pixel not being an abnormal pixel.

14. The image processing method according to claim 9, further comprising specifying an abnormal pixel, from the plurality of pixels excluding the specified abnormal pixel, according to a third method different from both of the first method and the second method.

15. The image processing method according to claim 14, wherein the first method specifies the abnormal pixel by using a ratio based on an output signal and a noise of the plurality of pixels, the second method specifies the abnormal pixel by using a difference between an output signal in a case where a plurality of sensor elements associated with the plurality of pixels are irradiated with incident light at a first intensity and an output signal in a case where the plurality of sensor elements are irradiated with incident light at a second intensity, and the third method specifies an abnormal pixel by using an output signal of the plurality of pixels.

16. A non-transitory computer readable storage medium storing a program causing a computer to execute:

first specification processing of specifying an abnormal pixel from a plurality of pixels according to a first method; and second specification processing of specifying an abnormal pixel, from the plurality of pixels excluding the abnormal pixel specified by the first specification processing, according to a second method different from the first method, wherein the first method specifies the abnormal pixel, based on a frequency distribution in which a characteristic of the plurality of pixels is represented by using a first variate, and the second method specifies the abnormal pixel, based on a frequency distribution in which a characteristic of the plurality of pixels excluding the abnormal pixel specified by the first specification method is represented by using a second variate different from the first variate, the frequency distribution in which the characteristic of the plurality of pixels is represented by using the first variate and the frequency distribution in which the characteristic of the plurality of pixels is represented by using the second variate have a plurality of peaks of frequency, and the frequency distribution in which the characteristic of the plurality of pixels is represented by using the first variate has a smaller overlapping region of distributions in comparison with the frequency distribution in which the characteristic of the plurality of pixels is represented by using the second variate.

* * * * *